United States Patent [19]

Shimakura

[11] Patent Number: 4,809,214

[45] Date of Patent: Feb. 28, 1989

[54] INFORMATION SEARCHING APPARATUS

[75] Inventor: Masami Shimakura, Kawasaki, Japan

[73] Assignee: Canon Kabushiki Kaisha, Tokyo, Japan

[21] Appl. No.: 758,734

[22] Filed: Jul. 25, 1985

[30] Foreign Application Priority Data

Jul. 31, 1984 [JP] Japan .................................. 59-158952
Jul. 31, 1984 [JP] Japan .................................. 59-158953

[51] Int. Cl.⁴ ........................................... G06F 13/00
[52] U.S. Cl. ................................................... 364/900
[58] Field of Search ... 364/200 MS File, 900 MS File; 360/72.2

[56] References Cited

U.S. PATENT DOCUMENTS

| | | | |
|---|---|---|---|
| 3,848,235 | 11/1974 | Lewis et al. | 364/200 |
| 3,987,419 | 10/1976 | Morrill et al. | 364/200 |
| 4,000,510 | 12/1976 | Cheney et al. | 360/72.2 X |
| 4,028,733 | 6/1977 | Ulicki | 360/72.2 X |
| 4,064,553 | 12/1977 | Kashio | 364/200 |
| 4,106,058 | 8/1978 | Romeas et al. | 360/72.2 X |
| 4,152,762 | 5/1979 | Bird et al. | 364/200 |
| 4,295,154 | 10/1981 | Hata et al. | 360/19.1 X |
| 4,449,198 | 5/1984 | Kroon et al. | 364/900 |

Primary Examiner—Thomas M. Heckler
Attorney, Agent, or Firm—Fitzpatrick, Cella, Harper & Scinto

[57] ABSTRACT

There is an information searching apparatus comprising: a photo disc device in which a plurality of image files are stored; a selecting circuit to select and read out one or a plurality of image files from among the image files stored in the photo disc device in accordance with a predetermined condition; a second memory device such as a semiconductor memory or a photo magnetic disc device to store the one or a plurality of image files read out by the selecting circuit; and a controller to control the readout of the image files from the photo disc device in accordance with the memory capacity of the second memory device and with the information quantity of the image files selected by the selecting circuit. In this apparatus, the search and readout of the image files are controlled by different controllers, so that a desired image file can be obtained for a short time.

12 Claims, 4 Drawing Sheets

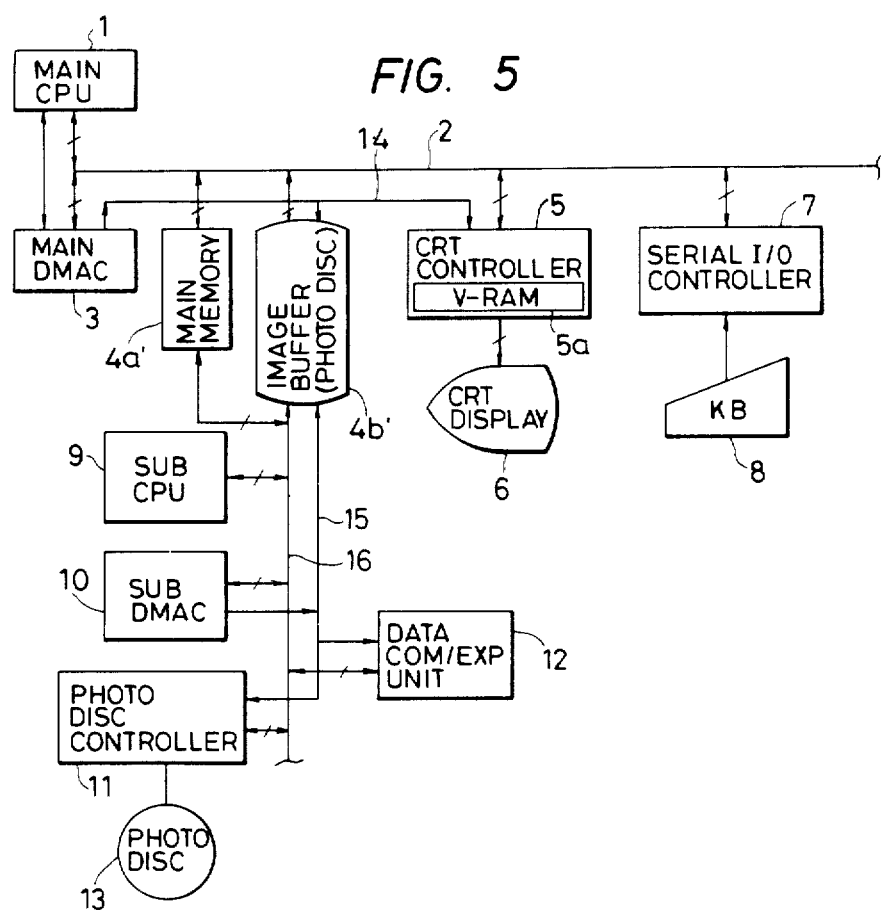

INFORMATION SEARCHING APPARATUS

BACKGROUND OF THE INVENTION

1. Field of the invention

The present invention relates to an information searching apparatus to search and output information such as documents, drawings and the like stored in a memory device such as a photodisc or the like.

2. Description of the Prior Art

Recently, there have been developed image information searching apparatuses which are constituted in a manner such that: image information such as documents, drawings or the like which are produced in great quantities is read by way of two-dimensional optical scan; this read image information and the search data corresponding thereto are sequentially stored in an auxiliary memory medium of a large memory capacity such as, for example, a photodisc device; upon searching, the search data is preliminarily read out from the photo disc device into a main memory device; the search code corresponding to this search data is inputted (key word search), thereby detecting and reading out the image information stored in the photodisc device; and this image information is outputted to an output apparatus, for example, a CRT display apparatus.

However, according to the foregoing apparatus, a large amount of image information is processed and the accessing speed of the photodisc device having a large memory capacity is slower than that of a semiconductor memory or a magnetic disc device. Therefore, after the last search code was inputted, it takes a long time until the searched image information is read out from the photo disc device and is displayed in the CRT display device when considering the seeking time and data reading time of the photodisc device, the data transfer times among respective peripheral apparatuses, converting time of the compression-coded image data into the image data, or the like. Thus, the image search working efficiency remarkably deteriorates.

SUMMARY OF THE INVENTION

It is an object of the present invention to eliminate the foregoing drawbacks.

Another object of the invention is to improve an information searching apparatus.

Still another object of the invention is to provide an information searching apparatus which can allow a desired information file to be outputted onto image output means in a short time in response to an output command of the operator after inputting the last search code.

Still another object of the invention is to provide an information searching apparatus which has second memory means for selecting and storing image information stored in first memory means and which can obtain desired image information in a short time.

Still another object of the invention is to provide an information searching apparatus which controls the readout of image information from first memory means in accordance with the capacity of second memory means for selecting and storing the image information stored in the first memory means and with the information quantity of the selected image information and which automatically stores the image information in the second memory means.

Still another object of the invention is to provide an information searching apparatus which controls the search and readout of image information by different control means, respectively, and which can obtain a desired image information in a short time.

Still another object of the invention is to provide an information searching apparatus which preliminarily transfers search information of image information recorded in a recording medium to another recording medium and which can obtain a desired image information in a short time.

Other objects and features of the present invention will become apparent from the following detailed description and the appended claims with reference to the accompanying drawings.

BRIEF DESCRIPTION OF THE DRAWINGS

FIG. 4 is a diagram to explain a format of a transfer request image file table of the invention; and FIG. 5 is an arrangement block diagram of an image information searching apparatus showing another embodiment of the present invention.

DETAILED DESCRIPTION OF THE PREFERRED EMBODIMENTS

An embodiment of the present invention will now be described hereinbelow with reference to the drawings with respect to an image information searching apparatus.

Figure 1:
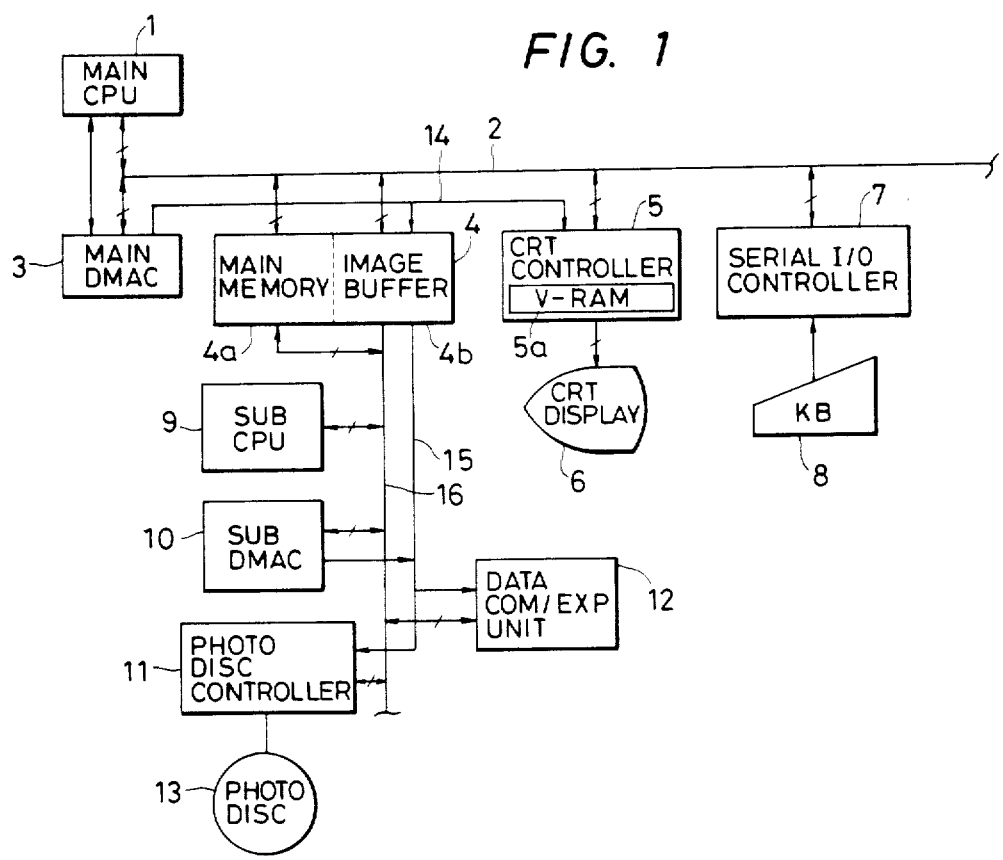
FIG. 1 is an arrangement block diagram of an image information searching apparatus showing an embodiment of the present invention.

FIG. 1 is an arrangement block diagram of an image information searching apparatus showing one embodiment of the present invention, in which reference numeral 1 denotes a main CPU (Main Central Processing Unit) having code interpretation means. A numeral 2 is a main system bus; 3 is a main DMAC (Main Direct Memory Access Controller); and 4 is a RAM (Random Access Memory) serving as readout information file storing means. The RAM 4 is constituted by a main memory section 4a for storing the search data and a dual port accessible image buffer 4b to take in the image file read out. A CRT controller 5 includes a V-RAM (Random Access Memory for video data) 5a and is connected to a CRT display section 6 serving as an image output apparatus. A keyboard 8 serving as input means is connected to a serial input/output controller 7. Reference sub CPU (Sub Central Processing Unit) 9 has readout command means. A numeral 10 is a sub DMAC (Sub Direct Memory Access Controller); 11 is a photodisc control section; 12 a data compression/expansion unit; 13 a photodisc device serving as information file storing means; and 14 a control line. The image buffer 4b and CRT controller 5 are controlled independently of the main CPU 1 through the control line 14 and main system bus 2 under permission of the main CPU 1. Reference numeral 15 is a control line. The sub DMAC 10 controls theimage buffer 4b, photodisc device 13 and data compression/expansion unit 12 independently of the sub CPU 9 through the control line 15 under permission of the sub CPU 9. A sub system bus 16 is connected to the image buffer 4b. The image buffer 4b has a dual port access arrangement in which information files can be written onto or read out from both of the main system bus 2 and sub system bus 16, and a priority for memory access is given to either of the system buses which was previously accessed. This priority is effective until either the main CPU 1 or the sub CPU 9 abandons the priority of the system bus which either of them possesses or until the privilege of the main CPU 1, for example, a command to display the data of the image buffer 4b is exercised.

The control operation will now be described with reference to flowcharts of FIGS. 2 and 3, in which (1) to (10) and (21) to (30) indicate respective steps of the method of the present invention.

Assuming that the quantity of data of one image file which is used is equal to the quantity of data of an image of, for example, A4 size (210 mm×297 mm), the memory capacity is 498.96 Kbytes in case of a binary image having an image resolution of 64 (8×8) dots per one square millimeter. In addition, when it is assumed that the image file area in the image buffer 4b is 8 Mbytes, up to sixteen image files of the A4 size can be stored in the image buffer 4b.

When the operator inputs a search information or an instruction to display or the like into the image information searching apparatus from the keyboard 8 in step (2) while observing the system condition (mentioned later) which is displayed in the CRT display section 6 in step (1), the analysis of the inputted search information or instruction is started by the main CPU 1 in step (3) and then a check is made to see if the control is completed or not (4). If it is YES in (4), the control is finished and the operation of the apparatus is stopped. If it is NO in (4), a check is made to see if a command to search the image information is generated or not (5). Further, if it is NO in (5), a check is made to see if the display control is started or not (6). If it is NO in (6), the processing routine is returned to step (1). If it is YES in (6), the searched image file is displayed in the CRT display section 6 in step (7) and the processing routine is returned to step (1). On the contrary, if the search of the image information is instructed in step (5), the search of the image file which is fitted to the key word inputted from the keyboard 8 is started (8) on the basis of the search data of the image data stored in the photo disc device 13 read out in the main memory section 4a. This search data is transferred and stored into the main memory section 4a whenever a photo disc medium is set in the photo disc device 13. Subsequently, the number of image files searched is compared with the maximum number of storage files which can be loaded in the image buffer 4b (hereinafter, this number is referred to as the image storage number), for example, with sixteen in step (9). If the number of image files searched from the photo disc device 13 is larger than the image storage number in this discriminating step, the processing routine is returned to step (1) to display the process situation such as the names of the searched image files, the number of searched image files or the liek in the CRT display section 6, and steps (1) to (9) are repeated. Then, the number of searched image files is sequentially reduced in accordance with the key word which is inputted by the operator. On the other hand, in the case where the number of searched image files becomes below the image storage number in the discrimination in step (9), a check is made to see if the searched image files are loaded in the image buffer 4b or not (10). If they are not loaded in step (10), the main CPU 1 transmits to the sub CPU 9 a readout command to read out the searched image files which are not loaded in the image buffer 4b from the photo disc device 13 in step (11). If they are loaded in step (10), the processing routine is returned to step (1) to wait for a display command from the operator.

Figure 3:
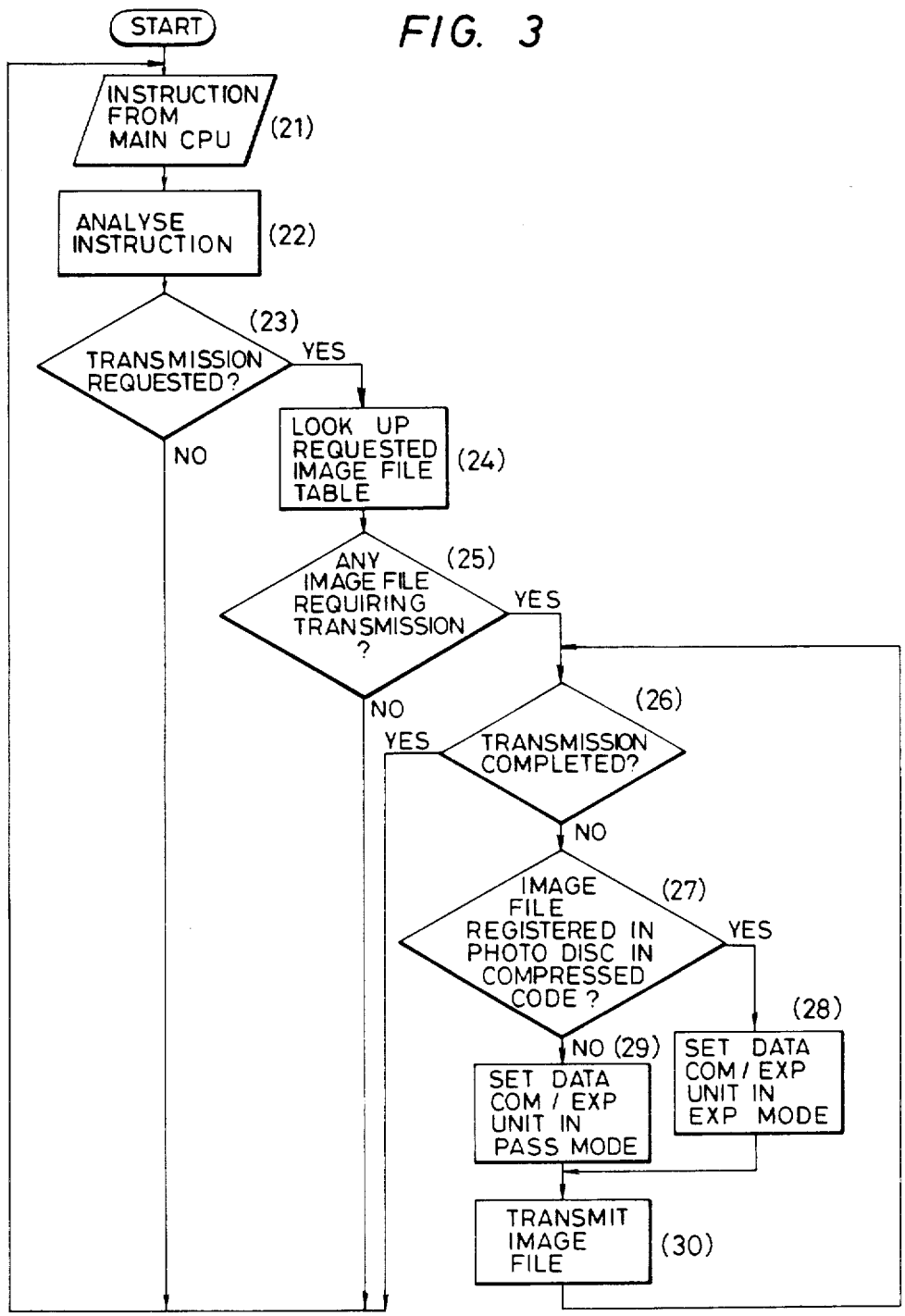

If the search command is inputted from the main CPU 1 to the sub CPU 9 in step (11), a flow shown in Fig. 3 is started (21). The instruction from the main CPU 1 is analyzed (22). A check is made to see if a transmission of the image files is requested or not (23), the processing routine is returned to step (21) to wait for the transmission request from the main CPU 1. If YES in (23), namely, in the case where the transmission request is generated frm the main CPU 1, a transmission requested image file table (shown in FIG. 4) which is made in the main memory section 4a is looked up (24). A check is made by a flag u in the transmission requested image file table to see if the transmission requested image files are read out into the image buffer 4b or not (it is assumed that those image files are not read out yet if the flag u of the image file is 0 and that they have already been read out if the flag u is 1) (25). If the flag u is 1, the processing routine is returned to step (21) and thereby waiting for a command from the main CPU 1. If the flag u is 0, a check is made to see if the transmission requested image files were completely transmitted from the photo disc device 13 into the image buffer 4b or not (26). If the transmission is finished, the processing routine is returned to step (21) to wait for a command from the main CPU 1. If it is not finished, the image files which are not read out yet into the image buffer 4b, although the transmission request has been generated by the flag u, are read out from the photo disc device 13. Then, by reading an image file attribute t in the transmission requested image file table which is made in the main memory section 4a, a check is likewise made to see if the image files which are read out from the photo disc device 13 by the sub CPU 9 are registered by way of compressed codes or not (27). If the image files are registered in the photo disc device 13 by means of ordinary codes, the data compression/expansion unit 12 is set into the pass mode (29). Then, the sub CPU 9 transmits instructions to the sub DMAC 10, photo disc controller 11, and image buffer 4b, thereby setting such that the image data read out from the photo disc dvice 13 by the sub DMAC 10 can be transmitted into the image buffer 4b through the data compression/expansion unit 12. After completion of this setting, the sub CPU 9 give the control right of the sub system bus 16 to the sub DMAC 10, thereby actuating the sub DMAC 10. Then, the transmission of the image files from the photo disc device 13 through the data compression/ expansion unit 12 into the image buffer 4b is started under control of the sub DMAC 10. After completion of the transmission of one image file, the control right of the sub system bus 16 is returned to the sub CPU 9. At this time, in step (30), the sub CPU 9 sets the flag u of the transmission requested image file table corresponding to the transmitted image file to 1 and the processing routine is returned to step (26). As described above, the operations in steps (21) to (30) are performed under the control of the sub CPU 9 independently of the main CPU 1. Therefore, the process to further reduce the number of searched image files by way of the key word which is key-inputted can be continuously executed. At the same time, a desired image file can be rapidly transmitted into the image buffer 4b.

In the case where the operator inputs the command to display image files, this display process can be soon performed by transmitting a desired image file data from the image buffer 4b into the V-RAM 5a in the CRT controller 5.

Although the case where the image files read out from the photo disc device 13 are loaded into the image buffer 4b has been described in the foregoing embodiment, a photo magnetic disc having a large memory capacity which can be rewritable may be also used in place of the image buffer 4b. FIG. 5 shows an arrangement diagram in such a case. In this case, a main memory section 4a' and a photo magnetic disc 4b' serving as an image buffer may have differenct arrangements. The other parts and components are substantially similar to those shown in FIG. 1; therefore, they are designated by the same reference numerals.

Assuming that the image file area of the photo magnetic disc 4b' is 500 Mbytes, up to 1002 image files of the A4 size can be stored in the photo magnetic disc 4b', so that the number of image files to be searched can be remarkably increased.

On one hand, in addition to image information, the present invention can be also applied to binary information, for example, code information which is processed by a word processor or the like.

The present invention is not limited to the foregoing embodiments but many modifications and variations are possible within the spirit and scope of the appended claims of the invention.

What I claimed is:

1. An information searching apparatus comprising:
   first memory means in which a plurality of image information files are stored;
   input means for inputting search information for searching for a desired image information file from among said plurality of image information files in said first memory means;
   search means for searching image information files to be read out from said first memory means, corresponding to said search information input by said input means;
   second memory means capable of storing a plurality of image information files searched and read out from said first memory means;
   transmitting means for transmitting a plurality of image information files searched by said search means in association with a common search information, from said first memory means to said second memory means; and
   means for selecting a desired image information file from among said image information files transmitted to said second memory means.

2. An information searching apparatus according to claim 1, wherein said transmitting means transmits said searched image information files from said first memory means to said second memory means when the number of said image information files searched by said search means is equal to or less than a predetermined number.

3. An information searching apparatus according to claim 2, wherein said transmitting means prohibits said searched image information files from being transmitted from said first memory means to said second memory means when the number of said image information files searched by said search means is more than said predetermined number.

4. An information searching apparatus according to claim 3, wherein said transmitting means prohibits a transmitting operation of image information files until the number of image information files further searched in association with different search information newly input by said input means becomes equal to or below said predetermined number.

5. An information searching apparatus according to claim 2, wherein said predetermined number is the number associated with the capacity of said second memory means.

6. An information searching apparatus according to claim 1, further comprising third memory means for storing an image information file selected by said selecting means.

7. An information searching apparatus according to claim 6, further comprising display means for displaying said image information file stored in said third memory means.

8. An information searching apparatus according to claim 1, wherein said first memory means is an optical memory.

9. An information searching apparatus according to claim 1, wherein said second memory means is a semiconductor memory.

10. An information searching apparatus according to claim 1, wherein said second memory means is an optical magnetic memory.

11. An information searching apparatus according to claim 1, wherein said second memory means stores non-compressed image information.

12. An information searching apparatus according to claim 1, wherein an access time for an image information file in said second memory means is shorter than that of said first memory means.

* * * * *

UNITED STATES PATENT AND TRADEMARK OFFICE
CERTIFICATE OF CORRECTION

PATENT NO. : 4,809,214
DATED : February 28, 1989
INVENTOR(S) : MASAMI SHIMAKURA

Page 1 of 2

It is certified that error appears in the above-identified patent and that said Letters Patent is hereby corrected as shown below:

IN [57] ABSTRACT

Line 16, "for" should read --in--.

SHEET 2

Figure 2:
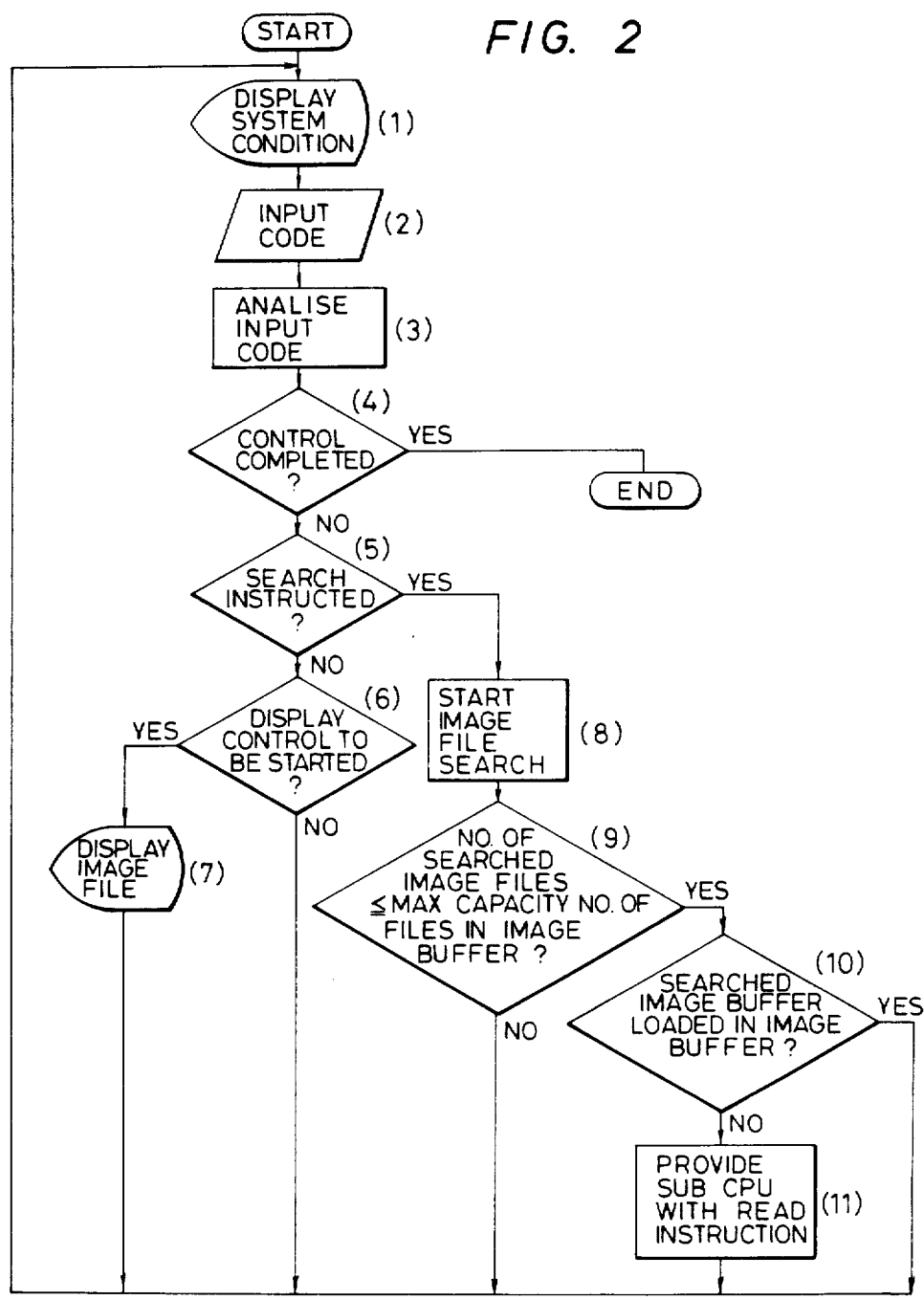
FIGS. 2 and 3 are flowcharts to explain the control operation of the apparatus shown in FIG. 1.

FIG. 2, "ANALISE" should read --ANALYZE--.
SHEET 3 "ANALYSE should read --ANALYZE--
SHEET 4

FIG. 4, "ID DODE" should read --ID CODE--.

COLUMN 1

Line 15, "two-dimensional" should read
           --a two-dimensional--.

COLUMN 2

Line 49, "Reference" should read --A--.
   Line 50, "A" should read --Reference--.
   Line 60, "theimage" should read --the image--.

COLUMN 3

Line 55, "liek" should read --like--.

UNITED STATES PATENT AND TRADEMARK OFFICE
CERTIFICATE OF CORRECTION

PATENT NO. : 4,809,214
DATED : February 28, 1989
INVENTOR(S) : MASAMI SHIMAKURA

Page 2 of 2

It is certified that error appears in the above-identified patent and that said Letters Patent is hereby corrected as shown below:

COLUMN 4

Line 7, "(23)," should read --(23). If the transmission is not requested in (23),--.
Line 37, "by means" should read --by way of the compressed codes, the data compression/ expansion unit 12 is set into the expansion mode (28). If the image files are registered in the photo disc device 13 by means--.
Line 42, "dvice 13" should read --device 13--.
Line 45, "give" should read --gives--.

COLUMN 5

Line 12, "differenct" should read --different--.
Line 31, "claimed" should read --claim--.

Signed and Sealed this

Tenth Day of April, 1990

Attest:

HARRY F. MANBECK, JR.

*Attesting Officer*   *Commissioner of Patents and Trademarks*